May 5, 1970   C. POTTER   3,510,139
GASKETS FOR SEALING JOINTS BETWEEN THE BELL
AND SPIGOT OF DRAIN PIPE
Filed June 23, 1967
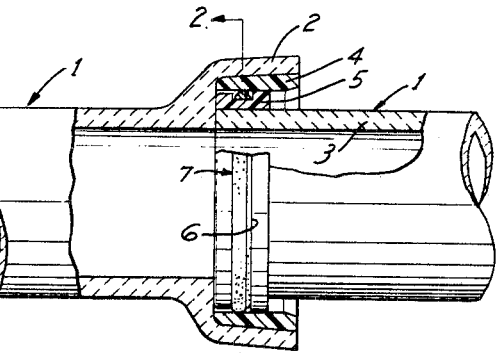
Fig. 1.
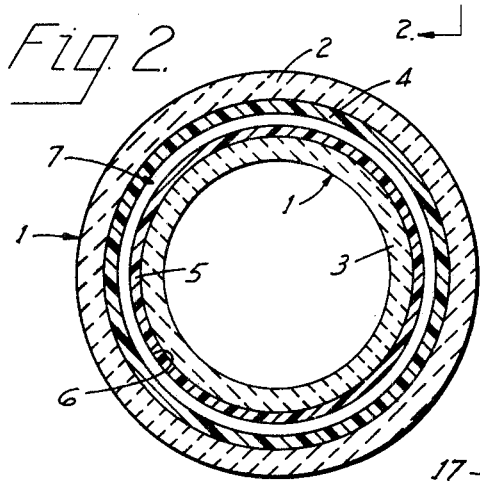
Fig. 2.
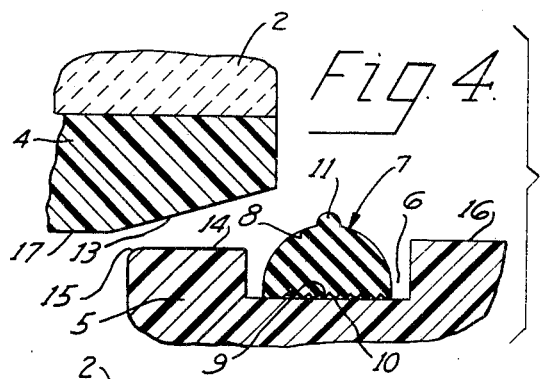
Fig. 4.
Fig. 5.
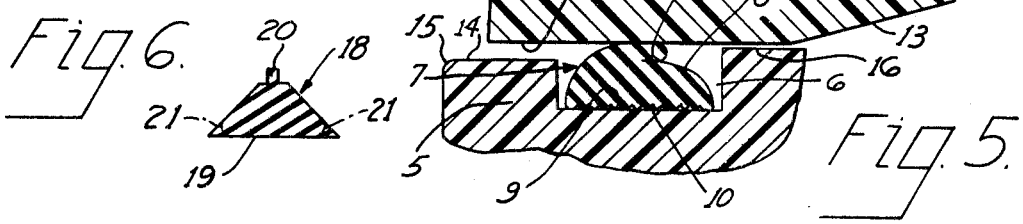
Fig. 6.
Fig. 3.
INVENTOR.
Charles Potter,
BY John H. Leonard,
his ATTORNEY.

United States Patent Office 3,510,139
Patented May 5, 1970

3,510,139
GASKETS FOR SEALING JOINTS BETWEEN THE BELL AND SPIGOT OF DRAIN PIPE
Charles Potter, Lakewood, Ohio, assignor to American Vitrified Products Company, Cleveland, Ohio, a corporation of New Jersey
Filed June 23, 1967, Ser. No. 648,491
Int. Cl. F16j 15/02, 21/02
U.S. Cl. 277—198          8 Claims

ABSTRACT OF THE DISCLOSURE

The improvement of the present invention is the seal of the joint between the bell and spigot of duplicate bell and spigot pipes, and particularly the gasket used in connection therewith and carried in a groove in the spigot. The gasket is convex outwardly toward the bell and has a generally chordal base which is drawn tightly against the bottom of the groove in stretch fitting relation. The gasket is provided with a peripheral bead and is so shaped so as to provide a ratio of radial or interference fit to resistance to axial assembly of the bell and spigot greater than is obtainable with conventional O-ring seals for pipes of like diameter.

---

This invention relates to gaskets for sealing joints between the bell and spigot of duplicate bell and spigot types of drain pipe.

Heretofore in forming such joints, the conventional practice has been to provide on the inside of the bell a true-up liner or sleeve of hard setting plastic, such as polyester, so as to present a cylindrical face toward the axis of the pipe, and to provide on the spigot an annular true-up collar of like material which is circular in cross section. The collar on the spigot usually is provided with a circumferential groove in which is disposed an O-ring of elastomeric material. The groove is somewhat wider than the diameter of the O-ring, and during the insertion of the spigot into the bell, the O-ring is caused to roll and twist about its circumferential axis due to the frictional resistance imposed on its peripheral surfaces by the liners of the bell and spigot. When a pipe joint is thus made with an O-ring, the twisted O-ring tends to be self-restoring and thereby continuously urges the spigot out of the bell. Furthermore, the O-ring, in order to provide a proper seal, must be made very resilient. The resilience thus required is generally such that there is a tendency for the O-ring to squeeze out through the space between the bell liner and the spigot collar toward the outer end of the bell during assembly of the spigot and bell. This phenomenon is well known and is generally referred to as "fish-mouthing."

The present gasket is one which, as compared to an O-ring, has higher tensile modulus and grips the pipe or spigot collar more tightly for a given radial stretch, and has a low center of gravity which is very close to the inner peripheral face of the annulus and hence close to the surface of the spigot collar on which the annulus is mounted. The low center of gravity resists twisting and rolling of the gasket during installation of the spigot in the bell. This resistance is augmented by the higher modulus. Furthermore, the gasket, as a whole, has a much greater cross sectional area than would an O-ring of the same internal and external diameters, which results in a much higher modulus in the present case.

The gasket, however, is provided with a circumferential bead which tends to fold back in a direction away from the spigot and bell when the spigot with the gasket installed thereon is inserted into the bell, and this arrangement increases the resistance of the gasket to withdrawal of the spigot from the bell.

The present gasket, utilizing the total amount of material to a greater advantage, is relatively inexpensive for the size and type of pipes with which it is to be used, as compared to other gaskets for the same purposes.

The specific objects and advantages of the present invention will become apparent from the following description wherein reference is made to the drawings, in which:

FIG. 1 is a fragmentary side elevation of a bell and spigot joint between two duplicate vitrified drain pipes with the present gasket installed therein;

FIG. 2 is an enlarged, cross sectional view of the joint illustrated in FIG. 1 and is taken on line 2—2 thereof;

FIG. 3 is an enlarged fragmentary longitudinal sectional view of the joint, taken on line 3—3 in FIG. 2, and showing the relation of the gasket to the bell liner and spigot collar.

FIG. 4 is an enlarged cross sectional view of the gasket and a fragment of the bell of one pipe and spigot of another, showing the gasket preparatory to completing the joint;

FIG. 5 is a fragmentary view similar to FIG. 4, but showing the relation of the gasket to the bell liner and spigot collar as the joint is being completed; and FIG. 6 is a fragmentary cross sectional view of a modified form of the gasket.

Referring to the drawings, duplicate vitrified sewer pipes 1 are shown, for purposes of illustration, with the bell 2 of one pipe accommodating the spigot 3 of the other pipe. As is customary in such vitrified pipes, a true-up liner 4 of a hard setting polyester resin is formed in the bell and presents an inner surface which is circular in cross section and of a precise diameter in each section. Correspondingly, on the spigot, a collar 5 of like hard setting plastic is provided and presents an outer surface which is circular and of precise diameter in each cross section. The collar 5 generally has a peripheral groove 6 opening outwardly thereof. The liner 4 and collar 5 are coaxial when the joint is completed.

Generally the spigot end of the pipe seats against the radial end wall portion of the liner 4, as best illustrated in FIG. 3. A gasket in the groove 6 effects the sealing relation between the bell liner 4 and spigot collar 5. For this purpose, a gasket 7, such as illustrated in FIGS. 3 through 5, and embodying the principles of the present invention, is employed.

The gasket 7 comprises an annulus of elastomeric material such, for example, as rubber, neoprene, polyvinyl chloride, and the like, capable of withstanding the usual acids and sewage residues to which it might be subjected in use in sewer pipe. The material preferably is one having durometric hardness of from 35 to 70.

The annulus has an outer peripheral face 8 and an inner peripheral face 9. The outer peripheral face is convex outwardly and extends continuously circumferentially of the endwise axis of the annulus. In the form illustrated in FIG. 4, when the ring is stretched onto the base of the groove 6, the faces 8 and 9 generally are shaped so that the cross section of the annulus in a radial plane extending axially of the annulus, the boundary of the face 8 defines approximately half the circumference of a circle, and the boundary of the face 9 defines approximately the diameter of the same circle.

The face 9 is generally cylindrical and of constant diameter, or it may be slightly concave in section in said radial plane. It may be provided with small circumferentially extending grooves 10 or with superficial patterns which increase its resistance to slippage endwise of the spigot.

The annulus shown in FIG. 4 has a section, of which the width at the face 9, endwise of the annulus, has a relation to the dimension of the convex face 8, endwise of the annulus substantially the same as the relation of a diameter of a circle to the semicircumference of the circle. An annulus of this cross section provides a higher tensile modulus for a given external diameter than does an O-ring, so that the face 9 frictionally grips the bottom of the groove 6 of the collar 5 very firmly. Further, the center of gravity of a cross section, as mentioned, is much nearer to the inner face 9 of the annulus than in the case of an O-ring, and hence is near to the surface of the bottom of the groove 6 so that, during the installation of the spigot in the bell, there is high resistance to twisting and rolling of the annulus and thereby to rocking of the face 9 endwise of the pipe away from the bottom wall surface of the groove 6. This greater resistance to twisting and rolling, however, makes necessary the provision on the annulus of a peripherally continuous bead 11 which can be flexed readily. The bead 11 is disposed at the axial midportion of the outer face 8 and may also be approximately in the form of a semicircle with its diameter substantially at the radially outermost circumference of the face 8. For example, the greatest width of the bead 11, which is at its juncture of the outermost surface of the face 8 can be from about 1/6 to 1/8 of the width of the face 9 of the annulus. The bead, however, need not be exactly semicircular, but may be somewhat differently shaped, though it should be relatively narrow axially of the annulus and of a height such that it can flex readily during insertion of the spigot and engage the liner 4 with effective sealing pressure against fluid pressures directed axially of the bead and urging it to assume its unflexed condition.

The height and width of the bead are selected for desirable balance with respect to the height and diameter of the annulus, and sealing presusre desired.

An important characteristic of the bead is that it is constructed so that with the face 9 remaining in the full gripping relation with the bottom of the groove 6, the bead can engage the inner wall of the liner 4 during insertion of the spigot axially into the bell and, under continued movement of the spigot to installed position, while the face 9 remains in situ, the bead bends over sufficiently and is deflected by frictional and compressive forces imposed by the liner 4, until the contiguous marginal surfaces of the bead and outer face 8, at their juncture at the side of the bead facing away from the spigot end of the pipe, are juxtaposed, as indicated at 12 in FIG. 5, or are close to juxtaposition. This reduces resistance to assembly, but the flexed over bead resists the withdrawal of the inserted spigot from the bell.

To appreciate more fully the functioning of the present gasket, it is noted that the entry end of the bell liner 4 has a frusto-conical guide or entry surface 13 disposed with its larger base at the outer end of the liner 4. The collar 5 has an outer end portion 14 extending from the outer end of the collar to the adjacent side of the groove 6 which is of such diameter and rounded at the outer edge, as at 15, as to facilitate initiation of entry of the collar 5 into the liner 4.

Between the innermost side wall of the groove 6 and the inner end of the collar 5, the collar has a cylindrical portion 16 of greater diameter than the portion 14. The portion 16 can engage the face of the inside of the bell liner 4 at such circumferential portion of the installed bell and spigot as to carry loads and resist radial forces imposed on the pipes and urging them to eccentric relation.

The action of an O-ring, were it used for a seal in the above pipe structure, has been described hereinbefore.

As compared to an O-ring seal used with the same pipes, if the present gasket, employing the same amount of material, had a radius equal to the diameter of the O-ring, it would extend so nearly the full width of the groove that when compressed during assembly it likely would become buttressed against spreading or expansion endwise of the pipes. As a result, it would exert too great an outward radial thrust on the bell with danger of rupturing the bell. However, as great an axial width of the base of the annulus as practical is desirable for preventing the twisting effect above described.

Therefore, the axial width of the base 9 of the annulus preferably is made slightly less than twice the diameter of an O-ring for a like groove and the reduction in the material of the main body of the annulus resulting from the axial shortening is thrown into the bead 11. As mentioned, such a bead offers less resistance to axial assembly of the bell and spigot than does the main body of the annulus, yet, due to folding over, resists withdrawal of the spigot from the bell. At the same time, because of the increase in overall radius of the gasket in the plane of the bead 11 due to the bead, as compared to radius of the main body of the gasket without the bead, a greater extent of radial interference between the gasket and a cylindrical wall portion 17 of the liner 4 is provided. This interference, since the bead is more readily distortable than the main body, may be of much greater extent than would be practical or safe if all of the interference were with the main body of the gasket. Hence the combined body and bead interference can be much greater than would be practical in a like body without the bead.

Again, due to the bead 11, the initial contact of the gasket and bell liner 4 is a contact of the bead 11, and hence is at a location spaced radially outwardly from the base of the groove 6 much beyond the center of gravity of the gasket cross section, thereby minimizing twisting, roll out, and "fish mouthing," as compared to an O-ring or a gasket such as the present but with the bead omitted.

On the other hand, the interference between the main body of the gasket and the wall portion 17 during final movement into assembled relation is reduced as compared to a gasket without a bead. Therefore, during assembly, the wall portion 17 initially strikes the main body of the gasket further outwardly from the center of gravity of the gasket cross section than it would in the case of a gasket of like interference without the bead, thereby reducing forces tending to roll or twist the gasket about its circumferential axis while retaining a good interference fit without imposing dangerous outward radial forces on the bell.

While the gasket cross section illustrated in FIGS. 4 and 5 is preferred, the cross section may be modified somewhat, but the center of gravity must remain near to the bottom of the groove or inner face of the gasket, the outer face of the gasket must be convex outwardly, and the bead should have a shape, size, and resiliency to impart the characteristic above described.

For example, a gasket of the cross section illustrated in FIG. 6 may be provided. Therein a gasket 18 of trapezoidal cross section is shown. It is disposed so that its larger base 19 can engage the bottom of the groove 6. Its smaller base, at the axial midportion of the gasket, carries an integral resilient bead 20 which is circumferentially continuous and may be somewhat rectangular in cross section. Such a bead can be shaped and proportioned so that it will bend over, during installation, in the manner described hereinbefore, so that one of its side faces is juxtaposed against the smaller base.

If desired, the extreme lower, or radially innermost corners of the cross section in FIG. 6, may be rounded off and the bottom portion of the trapezoid shaped as indicated by the dot and dash line 21 thus disposing the material of the gasket so as to obtain greater rigidity and stiffness at the bottom without the circumferential edges or margins being as thin and resilient as would be those of a true trapezoidal shape.

Having thus described my invention, I claim:

1. A gasket for sealing bell and spigot type pipe joints, comprising:
    an annulus of elastomeric material having an outer peripherally continuous face which, from one peripheral edge of the annulus to the other peripheral edge thereof, is outwardly convex in section in each radial plane through the annulus extending endwise of the longitudinal axis of the annulus, and having an inner peripherally continuous face which is approximately linear in section in each of said planes, and having a single integral elastomeric bead of very small section, relative to the section of the annulus, in each of said planes, said bead being peripherally continuous and projecting outwardly radially of the longitudinal axis of the annulus from the outer face of the annulus substantially midway between the ends of the annulus, the center of gravity of said cross sections being nearer to the inner face of the annulus than to the outer face thereof, said outer face of the annulus, at the portions adjacent to its intersection with the sides of the bead, respectively, extending in opposite directions from the bead, endwise of the annulus, each portion at a relatively flat angle to the longitudinal axis of the annulus and at a relatively abrupt angle, of at least 90°, to its associated side of the bead.

2. The structure according to claim 1 wherein the outer face of the annulus is curvilinear and outwardly convex in section in each of said planes throughout its lateral extent and intersects the inner face of the annulus at an angle of about 90°.

3. The structure according to claim 1 wherein the outer face is approximately semicircular in section in each of said planes.

4. The structure according to claim 1 wherein the annulus and bead have a durometric hardness of from 35 to 70.

5. The structure according to claim 1 wherein the maximum width of the section of the bead in each of said planes is from ⅙ to ⅛ of the maximum width of the annulus in each of said planes.

6. The structure according to claim 1 wherein the annulus in section in each of said planes is of a width of about twice its height exclusive of the bead.

7. The structure according to claim 1 wherein the gasket is mounted on the spigot of a pipe with its inner face juxtaposed against the spigot in gripping relation, the pipe has a bell liner which has a frusto-conical entry surface with the larger base at the outer end of the pipe and has a sealing surface which is substantially cylindrical and of the same diameter as the smaller base of the entry surface, the diameters of the entry surface are such that during assembly of the pipe with a duplicate pipe, the entry surface first engages only the bead at a predetermined distance outwardly from the center of gravity of the gasket, and progressively rocks the bead resiliently predominantly endwise of the annulus to a degree which effects sealing relation of the bead with the entry surface and which juxtaposes firmly the continguous side face of the bead and outer face portion of the annulus at the face of the bead facing generally endwise of the annulus away from the spigot without twisting any substantial portion of the said inner face, transversely of the axis, out of gripping relation to the spigot and finally which progressively increases the interference fit of the entry surface and then the sealing surface with the gasket radially inwardly from the bead and sufficiently near to the center of gravity of the gasket cross section to minimize twisting forces imposed on the gasket.

8. A gasket according to claim 1, in combination with a pipe having a bell at one end and a spigot at the other;

a liner in the bell having a sealing wall portion and a frusto-conical entry wall portion flaring outwardly radially from the sealing wall portion toward the outer end of the bell; said sealing wall portion being of the same diameter as the smaller base of the entry wall portion;

a collar on the spigot having a circumferential groove;

the gasket is in the groove in stretch fitting relation to the base of the groove;

said entry wall portion has a portion between its ends of the same diameter as the outer diameter of the bead; and said sealing wall portion has a diameter which, in the undistorted condition of the gasket, is greater than the diameter of a circle defined by the centers of gravity of the said cross sections of the gasket and less than the major diameter of the gasket at the base of the bead.

References Cited

UNITED STATES PATENTS

| | | |
|---|---|---|
| 2,247,609 | 7/1941 | Devilbiss. |
| 2,537,659 | 1/1951 | Eisner et al. |
| 3,185,491 | 5/1965 | Anderson _____ 277—237 |

FOREIGN PATENTS

| | | |
|---|---|---|
| 667,602 | 7/1963 | Canada. |
| 198,815 | 10/1965 | Sweden. |
| 1,423,100 | 11/1965 | France. |

SAMUEL ROTHBERG, Primary Examiner

U.S. Cl. X.R.

277—207; 285—231